(12) United States Patent
Maney (10) Patent No.: US 10,012,244 B2
(45) Date of Patent: Jul. 3, 2018

(54) HYDRAULIC HOSE END EXPANSION CHAMBER

(71) Applicant: Dale Maney, Mount Calvary, WI (US)

(72) Inventor: Dale Maney, Mount Calvary, WI (US)

( * ) Notice: Subject to any disclaimer, the term of this patent is extended or adjusted under 35 U.S.C. 154(b) by 6 days.

(21) Appl. No.: 15/610,793

(22) Filed: Jun. 1, 2017

(65) Prior Publication Data

US 2018/0017086 A1   Jan. 18, 2018

Related U.S. Application Data

(62) Division of application No. 15/208,962, filed on Jul. 13, 2016, now abandoned.

(51) Int. Cl.
| | |
|---|---|
| *F16L 55/04* | (2006.01) |
| *F15B 1/02* | (2006.01) |
| *F15B 1/04* | (2006.01) |

(52) U.S. Cl.
CPC ............... *F15B 1/025* (2013.01); *F15B 1/04* (2013.01); *F15B 2201/21* (2013.01); *F15B 2201/312* (2013.01)

(58) Field of Classification Search
CPC .................................. F15B 1/025; F15B 1/04
USPC ...................................................... 138/30, 31
See application file for complete search history.

(56) References Cited

U.S. PATENT DOCUMENTS

| | | | | |
|---|---|---|---|---|
| 2,630,833 A * | 3/1953 | Ragsdale | ............. | F16L 55/052 138/26 |
| 3,960,179 A * | 6/1976 | Zahid | ........................ | F15B 1/14 138/26 |
| 4,032,265 A * | 6/1977 | Miller | ................. | F04B 11/0016 137/565.34 |
| 4,736,750 A * | 4/1988 | Valdespino | .......... | A61B 5/0871 600/538 |
| 4,819,698 A * | 4/1989 | Ismert | ................... | F16L 55/053 138/26 |
| 6,095,195 A * | 8/2000 | Park | ...................... | F16L 55/053 138/30 |
| 6,470,859 B2 * | 10/2002 | Imura | ..................... | F02M 55/04 123/447 |
| 8,267,123 B2 * | 9/2012 | LeBlanc | .................... | F15B 1/24 138/30 |
| 2003/0221672 A1 * | 12/2003 | Zdroik | ................ | F02M 69/465 123/456 |
| 2004/0123912 A1 * | 7/2004 | Weber | ...................... | F15B 1/14 138/30 |

(Continued)

*Primary Examiner* — James Hook
(74) *Attorney, Agent, or Firm* — Donald J. Ersler (57) ABSTRACT

A hydraulic hose end expansion chamber preferably includes a tube, a first end plate, a second end plate, a threaded nipple, an o-ring and a drain screw. The threaded nipple is attached to the first end plate. The threaded nipple is threadably engaged with a threaded hole in a female hydraulic quick disconnect coupler. The first end plate is attached to a first end of the tube. A threaded hole is formed through the second end plate to threadably receive the drain screw. The o-ring is pushed on to the threaded shaft. The second end plate is attached to a second end of the tube. An L-shaped handle is preferably attached to the second end of the tube. A second embodiment of the hydraulic hose end expansion chamber includes a compression spring with a piston. A third embodiment of the hydraulic hose end expansion chamber includes a nitrogen filled bladder.

13 Claims, 6 Drawing Sheets

(56) References Cited

U.S. PATENT DOCUMENTS

2005/0051223 A1\* 3/2005 Lombari ............... F16L 55/052
 138/30
2007/0144598 A1\* 6/2007 Dooley ................ F16L 55/052
 138/30
2011/0036437 A1\* 2/2011 McCoy ................ F16L 55/053
 138/26

\* cited by examiner

HYDRAULIC HOSE END EXPANSION CHAMBER

CROSS-REFERENCES TO RELATED APPLICATIONS

This is a divisional patent application claiming the benefit of application Ser. No. 15/208,962, filed on Jul. 13, 2016.

BACKGROUND OF THE INVENTION

Field of the Invention

The present invention relates generally to hydraulics and more specifically to a hydraulic hose end expansion chamber, which prevents difficulty in attaching supply hydraulic hose to a hydraulic power source.

Discussion of the Prior Art

It appears that the prior art does not teach or suggest a hydraulic hose end expansion chamber, which is attached to a hydraulic hose to prevent damage to the hydraulic hose and seals from thermal expansion of hydraulic fluid therein. The hydraulic hose end expansion chamber is manually attached to an implement or attachments hose, after the implement or attachment is unhooked from its power source. The hydraulic hose end expansion chamber protects the hydraulics of the implement or attachment while out of service. And prevents high pressure build up, from thermal expansion, which creates difficulty when needing to reattach implement or attachment. The hydraulic hose end expansion chamber is then manually uncoupled from the hose end of implement or attachment prior to reattaching back to the power source.

Accordingly, there is a clearly felt need in the art for a hydraulic hose end expansion chamber, which allows heat expansion of hydraulic oil in a hydraulic hose to expand into an overflow chamber to prevent damage to seals; prevent hose leaks; and prevent difficulty of attaching the hydraulic hose to another hydraulic coupler.

SUMMARY OF THE INVENTION

The present invention provides a hydraulic hose end expansion chamber, which prevents damage to hydraulic hose seals and prevents hydraulic hose leaks. The hydraulic hose end expansion chamber preferably includes a tube, a first end plate, a second end plate, a threaded nipple, an o-ring and a drain screw. A first hole is formed through the first end plate. An inner diameter of the threaded nipple is aligned substantially concentric with the first hole. The threaded nipple is attached to the first end plate with welding or the like. An end of the threaded nipple is sized to be threadably engaged with a threaded hole in a female hydraulic quick disconnect coupler. The first end plate is attached to a first end of the tube with welding or the like. A threaded hole is formed through the second end plate. The threaded hole is sized to threadably receive a threaded shaft of the drain screw. The o-ring is sized to be tightly received by the threaded shaft. The second end plate is attached to a second end of the tube with welding or the like. The tube, the first end plate and the second end plate form an overflow chamber in an inner area of the tube. The overflow of hydraulic oil from the hydraulic hose flows into the overflow chamber. When the hydraulic oil contracts, the hydraulic oil flows back into the hydraulic hose. An L-shaped handle is preferably attached to the tube with welding or the like. However, other objects may be substituted for the L-shaped handle, such as a bolt threaded into the tube or a mounting plate with fastener holes.

A second embodiment of the hydraulic hose end expansion chamber includes a compression spring and a piston. The piston includes a piston disc and a piston o-ring. An o-ring groove is formed in an outer diameter of the piston disc to receive the piston o-ring. The piston o-ring is sized to be slidably received by an inner diameter of the tube. The piston is inserted into the tube and pushed against the first end plate. The compression spring preferably has an outer diameter, which is slightly smaller than the inner diameter of the tube. The compression spring is inserted into the tube, such that it is located between the piston and the second end of the tube. The second end plate is attached to the second end of the tube, after the insertion of the compression spring and piston. The overflow of hydraulic oil from the hydraulic hose pushes the piston away from the first end of the tube. When the hydraulic oil contracts, the piston pushes the hydraulic oil back into the hydraulic hose.

A third embodiment of the hydraulic hose end expansion chamber includes a nitrogen filled bladder. An outside perimeter and length of the nitrogen bladder is sized to be received by the overflow chamber of the tube. The nitrogen bladder is inserted into the tube. The second end plate is attached to the second end of the tube. Overflow of hydraulic oil from the hydraulic hose compresses the nitrogen filled bladder. When the hydraulic oil contracts, the nitrogen filled bladder pushes the hydraulic oil back into the hydraulic hose.

A fourth embodiment of the hydraulic hose end expansion chamber includes an integrated female hydraulic quick disconnect coupler. The female hydraulic quick disconnect coupler is formed on the first end plate, eliminating the need for a threaded nipple.

A fifth embodiment of the hydraulic hose end expansion chamber includes at least two threaded nipples for the attachment of at least two female hydraulic quick disconnect couplers.

Accordingly, it is an object of the present invention to provide a hydraulic hose end expansion chamber, which allows heat expansion of hydraulic oil in a hydraulic supply side hose to expand into an overflow chamber to prevent damage to hose seals; prevent hose leaks; and prevent difficulty of attaching the hydraulic hose to a hydraulic power source.

These and additional objects, advantages, features and benefits of the present invention will become apparent from the following specification.

DETAILED DESCRIPTION OF THE PREFERRED EMBODIMENTS

Figure 1:
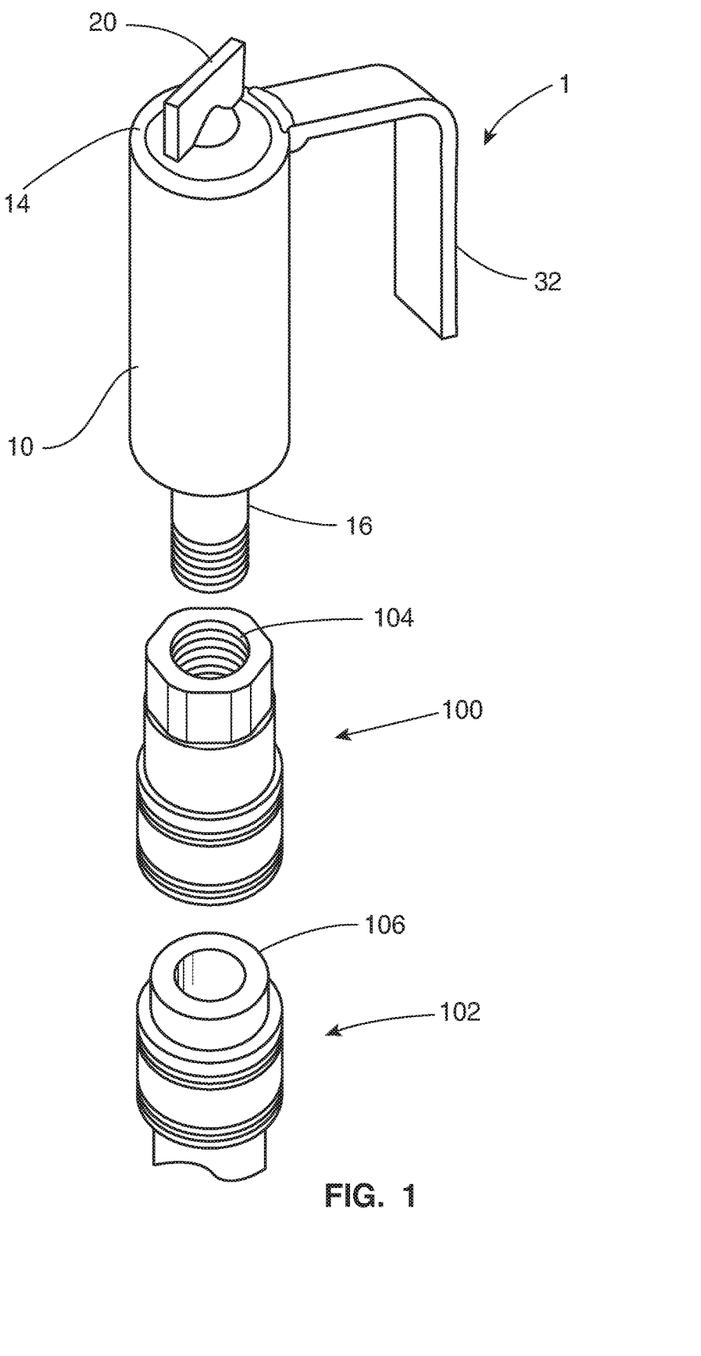
FIG. 1 is a partially exploded perspective view of a hydraulic hose end expansion chamber, a female hydraulic quick disconnect coupler and an end of a hydraulic hose in accordance with the present invention.
Figure 2:
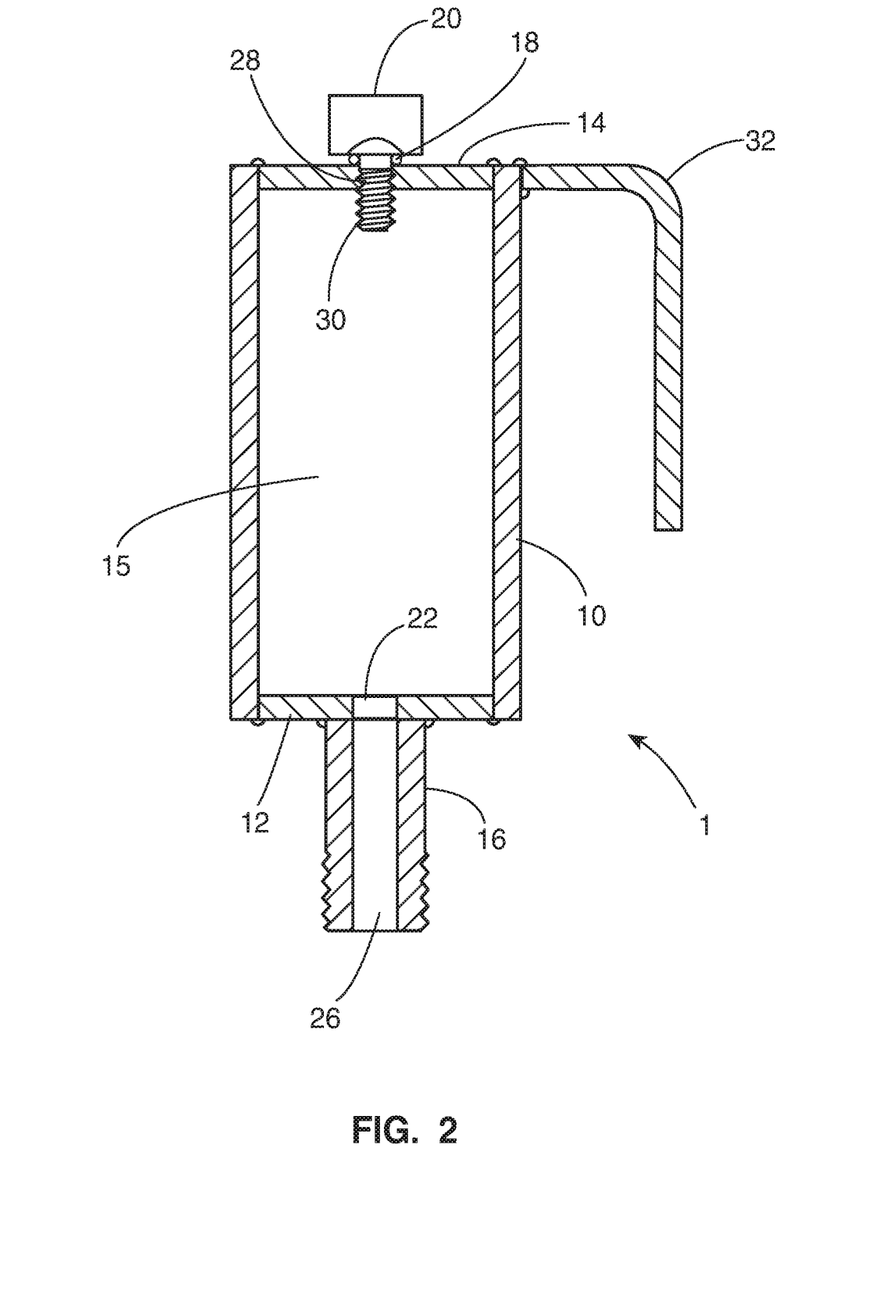
FIG. 2 is a cross sectional view of a hydraulic hose end expansion chamber in accordance with the present invention.

With reference now to the drawings, and particularly to FIG. 1, there is shown a partially exploded perspective view of a hydraulic hose end expansion chamber 1, a female hydraulic quick disconnect coupler 100 and an end of a hydraulic hose 102. With reference to FIG. 2, the hydraulic hose end expansion chamber 1 preferably includes a tube 10, a first end plate 12, a second end plate 14, a threaded nipple 16, an o-ring 18 and a drain screw 20. A first hole 22 is formed through the first end plate 12. An inner diameter 26 of the threaded nipple 16 is aligned substantially concentric with the first hole 22. The threaded nipple 16 is attached to the first end plate 12 with welding or the like. However, the first end plate 12 and the threaded nipple 16 may be fabricated from a single piece of material. The threaded nipple 16 is sized to be threadably engaged with a threaded hole 104 of a female hydraulic quick disconnect coupler 100. The hydraulic hose 102 includes a male hydraulic quick disconnect coupler 106, which mates with the female hydraulic quick disconnect coupler 100. The first end plate 12 is attached to a first end of the tube 10 with welding or the like. A threaded hole 28 is formed through the second end plate 14. The threaded hole 28 is sized to threadably receive a threaded shaft 30 of the drain screw 20. A drain plug may be substituted for the drain screw 20. The o-ring 18 is sized to be tightly received by the threaded shaft 30. The second end plate 14 is attached to a second end of the tube 10 with welding or the like.

The tube 10, the first end plate 12 and the second end plate 14 form an overflow chamber 15 in an inner area of the tube 10. The drain screw 20 may be removed to drain excess hydraulic fluid from the overflow chamber 15. The second end plate 14 and the tube 10, or the first end plate 12 and the tube 10 could be fabricated from a single piece of material to form a cup. An L-shaped handle 32 is preferably attached to the second end of the tube 10 with welding or the like. The overflow of hydraulic fluid from the hydraulic hose 102 flows into the overflow chamber 15 of the tube 10. If the overflow of hydraulic fluid is greater than a volume of the overflow chamber 15, the hydraulic fluid will exit through the junction of the o-ring 18 and the second end plate 14. However, a very high pressure is required to break the seal of the o-ring 18. The L-shaped handle 32 is hung on an object, which is higher than an end of the hydraulic hose 102 to allow drainage of overflow hydraulic fluid. However, other objects may be substituted for the L-shaped handle 32, such as a bolt threaded into the tube 10.

Figure 3:
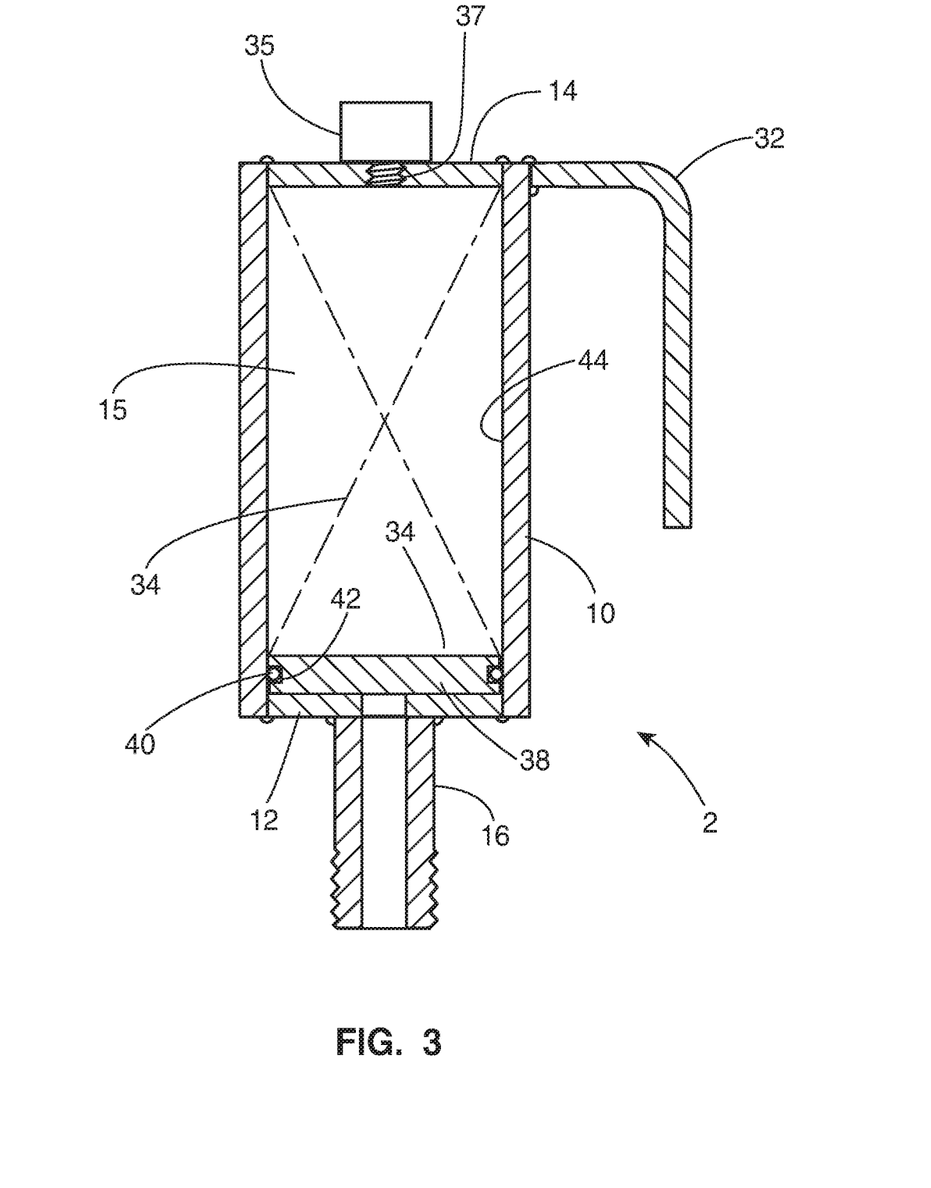
FIG. 3 is a cross sectional view of a second embodiment of a hydraulic hose end expansion chamber in accordance with the present invention.

With reference to FIG. 3, a second embodiment of the hydraulic hose end expansion chamber 2 includes a compression spring 34 and a piston 36. The piston 36 includes a piston disc 38 and a piston o-ring 40. An o-ring groove 42 is formed in a perimeter of the piston disc 38 to receive the piston o-ring 40. The piston o-ring 40 is sized to be slidably received by an inner diameter 44 of the tube 10. The piston 36 is inserted into the tube 10 and pushed against the first end plate 12. The compression spring 34 preferably has an outer diameter, which is slightly smaller than the inner diameter 44 of the tube 10. The compression spring 34 is inserted into the tube 10, such that it is located between the piston 36 and the second end of the tube 10. The second end plate 14 is attached to the second end of the tube 10, after the insertion of the compression spring 34 and piston 36. A breather 35 is preferably retained in a threaded hole 37 in the second end plate 14. The breather 35 allows air to enter and exhaust from the overflow chamber 15, but does not allow debris to enter the overflow chamber 15. The overflow of hydraulic oil from the hydraulic hose 102 pushes the piston 36 away from the first end of the tube 10. When the hydraulic oil contracts, the compression spring 34 pushes the hydraulic oil back into the hydraulic hose 102 with the piston 36.

Figure 4:
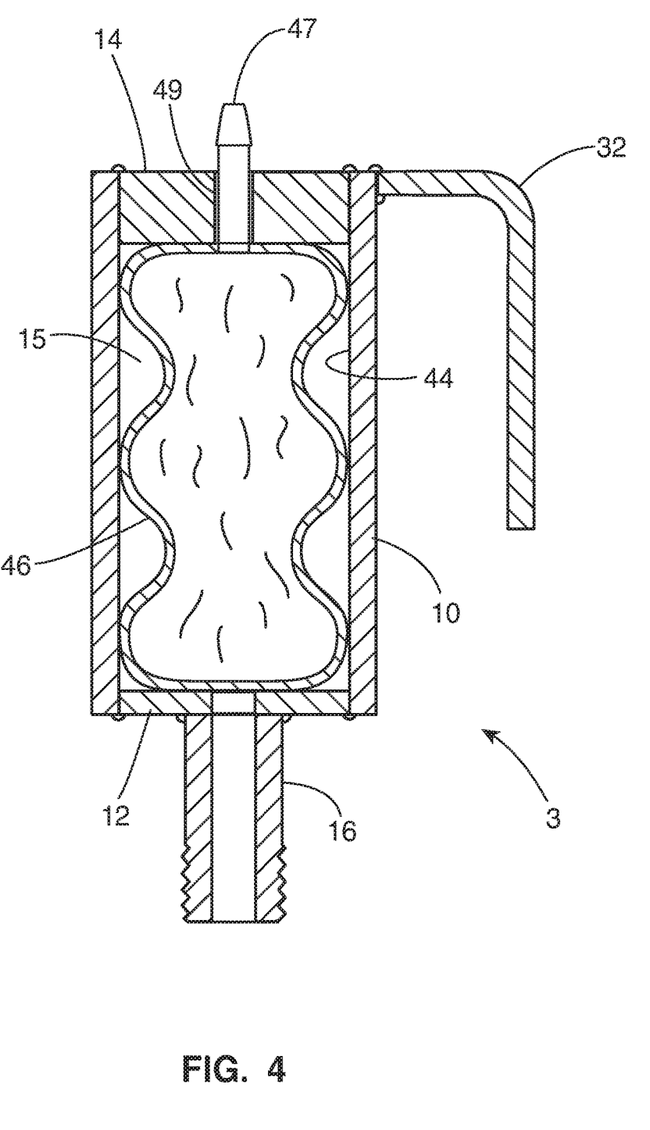
FIG. 4 is a cross sectional view of a third embodiment of a hydraulic hose end expansion chamber in accordance with the present invention.
Figure 5:
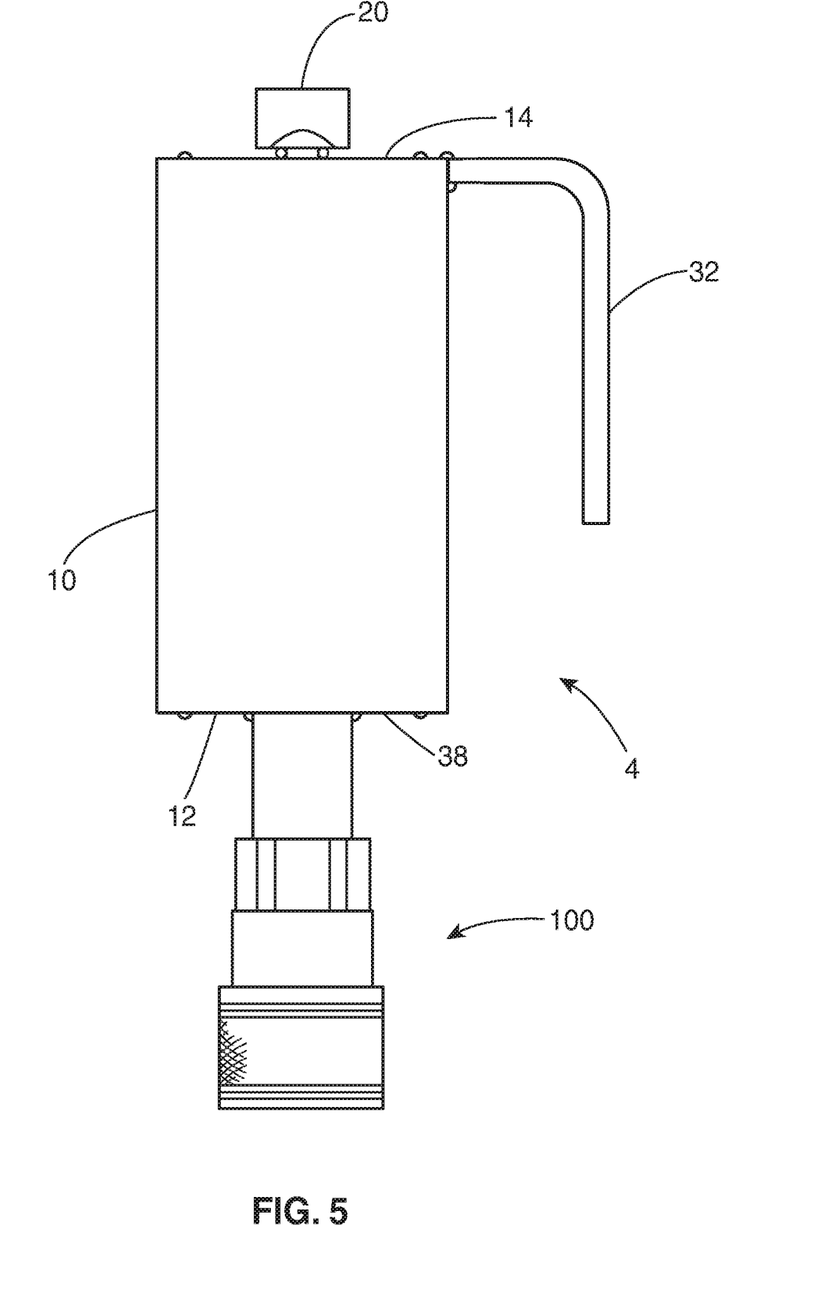
FIG. 5 is a front view of a fourth embodiment of a hydraulic hose end expansion chamber in accordance with the present invention.

With reference to FIG. 4, a third embodiment of the hydraulic hose end expansion chamber 3 includes a nitrogen filled bladder 46. The nitrogen filled bladder 46 preferably includes a fill nozzle 47. An outside perimeter and length of the nitrogen bladder 46 is sized to be received by the overflow chamber 15 of the tube 10. The nitrogen bladder 46 is inserted into the tube 10. The second end plate 14 is attached to the second end of the tube 10. A nozzle hole 49 is formed through the second end plate 14 to provide clearance for the fill nozzle 47. The overflow of hydraulic oil from the hydraulic hose 102 compresses the nitrogen filled bladder 46. When the hydraulic oil contracts, the nitrogen filled bladder 46 pushes the hydraulic oil back into the hydraulic hose 102. With reference to FIG. 5, a fourth embodiment of the hydraulic hose end expansion chamber 4 includes an integrated female hydraulic quick disconnect coupler. The female hydraulic quick disconnect coupler 100 is formed on the first end plate 12, which eliminates the need for the threaded nipple 16.

Figure 6:
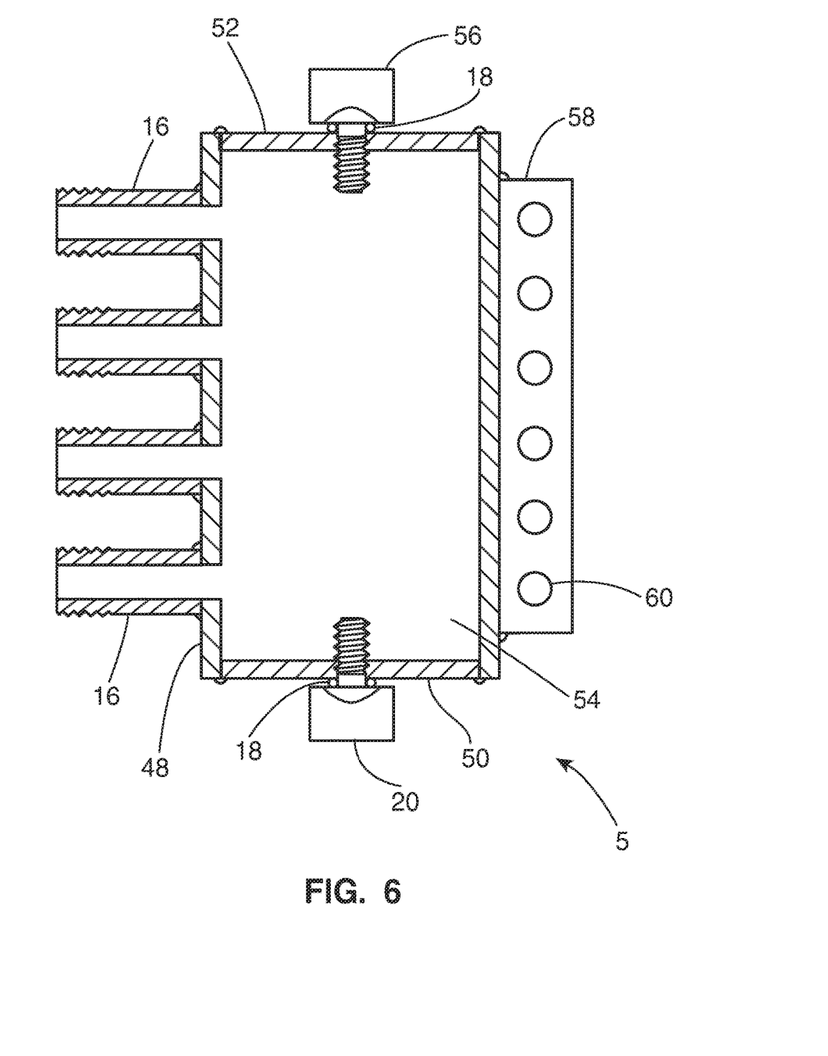
FIG. 6 is a cross sectional view of a fifth embodiment of a hydraulic hose end expansion chamber in accordance with the present invention.

With reference to FIG. 6, a fifth embodiment of the hydraulic hose end expansion chamber 5 includes at least two threaded nipples 16 for attachment of at least two female hydraulic quick disconnect couplers 100. The hydraulic hose end expansion chamber 5 includes a tubular member 48, a first end plate 50 and a second end plate 52. The tubular member 48 is terminated on a first end with the first end plate 50 and terminated with the second end plate 52 on a second end. The tubular member 48, the first end plate 50 and the second end plate 52 form an overflow chamber 54. The at least two threaded nipples 16 are formed on an outer surface of the overflow chamber 54. A drain screw 20 is threadably engaged with the first end plate 50. A bleed screw 56 is threadably engaged with the second end plate 52. A mounting plate 58 is preferably attached to a side wall of the tubular member 48. The mounting plate includes a plurality of fastener holes 60.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of preventing damage to a hydraulic device, comprising the steps of:

providing an overflow chamber having a threaded end, said threaded end including an inner perimeter that communicates with said overflow chamber;

threading a female hydraulic quick disconnect coupler to said threaded end;

providing an unconnected hydraulic hose of the hydraulic device with a male hydraulic quick disconnect coupler;

connecting said male hydraulic quick disconnect coupler to said female hydraulic quick disconnect coupler, wherein if hydraulic fluid in said hydraulic device expands, said hydraulic fluid flows into said overflow chamber; and disconnecting said male hydraulic quick disconnect coupler from said female hydraulic quick disconnect coupler before attachment of said male hydraulic quick disconnect coupler to a hydraulic power source.

2. The method of preventing damage to a hydraulic device of claim 1, further comprising the step of:

forming at least one threaded hole through a wall of said overflow chamber to receive a sealing threaded fastener.

3. The method of preventing damage to a hydraulic device of claim 1, further comprising the step of:

attaching an L-shaped bracket to an outside wall of said overflow chamber.

4. The method of preventing damage to a hydraulic device of claim 1, further comprising the step of:

constructing said overflow chamber from a cylinder sealed on each end with two end plates.

5. The method of preventing damage to a hydraulic device of claim 1, further comprising the step of:

retaining a nitrogen filled bladder in said overflow chamber.

6. The method of preventing damage to a hydraulic device of claim 1, further comprising the step of:

retaining a piston in said overflow chamber, biasing said piston against an entrance to said overflow chamber.

7. The method of preventing damage to a hydraulic device of claim 1, further comprising the step of:

attaching a mounting plate to an outside wall of said overflow chamber, said mounting plate includes a plurality of fastener holes.

8. A method of preventing damage to a hydraulic device, comprising the steps of:

providing an overflow chamber having a female hydraulic quick disconnect coupler, said female hydraulic quick disconnect coupler communicates with said overflow chamber;

providing an unconnected hydraulic hose of the hydraulic device with a male hydraulic quick disconnect coupler;

connecting said male hydraulic quick disconnect coupler to said female hydraulic quick disconnect coupler, wherein if hydraulic fluid in said hydraulic device expands, said hydraulic fluid flows into said overflow chamber; and disconnecting said male hydraulic quick disconnect coupler from said female hydraulic quick disconnect coupler before attachment of said male hydraulic quick disconnect coupler to a hydraulic power source.

9. The method of preventing damage to a hydraulic device of claim 8, further comprising the step of:

forming at least one threaded hole through a wall of said overflow chamber to receive a sealing threaded fastener.

10. The method of preventing damage to a hydraulic device of claim 8, further comprising the step of:

attaching an L-shaped bracket to an outside wall of said overflow chamber.

11. The method of preventing damage to a hydraulic device of claim 8, further comprising the step of:

constructing said overflow chamber from a cylinder sealed on each end with two end plates.

12. The method of preventing damage to a hydraulic device of claim 8, further comprising the step of:

retaining a nitrogen filled bladder in said overflow chamber.

13. The method of preventing damage to a hydraulic device of claim 8, further comprising the step of:

retaining a piston in said overflow chamber, biasing said piston against an entrance to said overflow chamber.

* * * * *